US005377313A

United States Patent [19]
Scheibl

[11] Patent Number: 5,377,313
[45] Date of Patent: Dec. 27, 1994

[54] COMPUTER GRAPHICS DISPLAY METHOD AND SYSTEM WITH SHADOW GENERATION

[75] Inventor: Frederick J. Scheibl, Rhinebeck, N.Y.

[73] Assignee: International Business Machines Corporation, Armonk, N.Y.

[21] Appl. No.: 827,232

[22] Filed: Jan. 29, 1992

[51] Int. Cl.$^5$ .............................................. G06F 15/72
[52] U.S. Cl. ..................................... 395/122; 395/126
[58] Field of Search ............... 395/122, 123, 126, 119, 395/120, 121, 132, 161

[56] References Cited

U.S. PATENT DOCUMENTS

| | | | |
|---|---|---|---|
| 4,625,289 | 11/1986 | Rockwood | 395/122 |
| 4,737,921 | 4/1988 | Goldwasser et al. | 395/121 |
| 4,855,938 | 8/1989 | Gonzalez-Lopes et al. | 395/122 |
| 5,027,292 | 6/1991 | Rossignac et al. | 395/122 |
| 5,043,922 | 8/1991 | Matsumoto | 395/122 |
| 5,083,287 | 1/1992 | Obata et al. | 395/126 |
| 5,123,085 | 6/1992 | Wells et al. | 395/122 |
| 5,175,805 | 12/1992 | Carrie | 395/122 |
| 5,222,203 | 6/1993 | Obta | 395/126 |
| 5,265,198 | 11/1993 | Gonzalez-Lopez et al. | 395/122 |
| 5,265,199 | 11/1993 | Catlin | 395/122 |
| 5,268,996 | 12/1993 | Steiner et al. | 395/126 |

FOREIGN PATENT DOCUMENTS

0358493A2 3/1990 European Pat. Off. .
2223384 4/1990 United Kingdom .

OTHER PUBLICATIONS

Bergeron, P., "A General Version of Crow's Shadow Volumes," IEEE, pp. 17-28, Sep. 1986.

Appel, A., "Some Techniques for Shading Machine Renderings of Solids", Proc. SJCC, Thompson Books, Washington, D.C., pp. 37-45, 1968.

Bouknight et al., "An Algorithm for producing Half-Tone Computer Graphics Presentations with Shadows and Movable Light Sources," AFIPS Conf. Proc., vol. 36, AFIPS Press, Reston, Va., pp. 1-10, 1970.

Atherton et al., "Polygon Shadow Generation," Computer Graphics, (Proc. Siggraph 78), vol. 12, No. 3, pp. 275-281, Jul. 1978.

Crow, Franklin C., "Shadow Algorithms for Computer Graphics," Computer Graphics, (Proc. SIGGRAPH 77), vol. 11, No. 3 pp. 242-248, Jul. 1977.

Williams, L., "Casting Curved Shadows on Curved Surfaces," Computer Graphics, (Proc. SIGGRAPH 78), vol. 12, No. 3, pp. 270-274, Jul. 1978.

Whitted, T., "An Improved Illumination Model for Shaded Display," Comm. ACM, vol. 23, No. 6, pp. 343-349, Jun. 1980.

Brotman et al., "Generating Soft Shadows with a Depth Buffer Algorithm," IEEE CG & A, vol. 4, No. 10, pp. 5-12, Oct. 1984.

Max, N., "Atmospheric Illumination and Shadows," (Proc. SIGGRAPH 86), vol. 20, No. 4, pp. 117-124, 1986.

Hourcade et al., "Algorithms for Antialiased Cast Shadows," Computer Graphics, vol. 9, No. 3, pp. 259-265, 1985.

Cohen et al., "The Hemi-Cube A Radiosity Solution for Complex Environments", Proc. SIGGRAPH, vol. 19, No. 3, pp. 31-40, 1985.

*IEEE Computer Graphics and Applications,* Jan. 1984, vol. 4, No. 1, "Generating Soft Shadows with a Depth Buffer Algorithm", L. Brotman et al., pp. 5-12.

*8222 IEEE Computer Graphics and Applications,* Mar. 1989, No. 2, Los Alamitos, Calif. USA, "Surface Shadowing Spatial Transformations for Rapid Scan-Line Surface Shadowing", P. Robertson, pp. 30-38.

*2388 Computers & Graphics,* 1985, Elsmford, N.Y., "Algorithms for Antialiased Cast Shadows", J. Hourcade et al., pp. 259-265.

*Primary Examiner*—Heather R. Herndon
*Assistant Examiner*—Cliff N. Vo
*Attorney, Agent, or Firm*—Heslin & Rothenberg

[57] ABSTRACT

A computer graphics display system and method are described for rendering a scene formed of at least one geometric primitive as a pixel image having shadows produced by at least one defined light source. Multiple passes are made through the primitive data structure for each light source capable of producing shadows in the scene to be rendered. In a first pass, the scene is rendered to a frame buffer in the usual way, but using only the ambient component of the light specification, and a first Z-buffer is updated with the viewpoint Z value. For each defined light source (i), two additional passes (PASS $2i$ & $2i+1$) through the data structure are required. In the first of these, a transformation matrix is set up in such a way that the viewpoint is moved to the position of the light source. The scene is then rendered in the usual way except that the frame buffer is not updated, and a second Z-buffer (light source view Z-buffer) is used instead of the first Z-buffer. In the next pass, the shaded image and shadows are generated in parallel using the content of the first and second Z-buffers. When the frame buffer is updated, it is accomplished in a cumulative manner with each computed intensity value due to a specific light source being added to any value already stored there. In this way, intensities resultant from each of multiple light sources are accumulated on the image.

20 Claims, 8 Drawing Sheets fig. 1 fig. 2 fig. 3 fig. 4A fig. 4B fig. 4C1 fig. 4C2 fig. 5

COMPUTER GRAPHICS DISPLAY METHOD AND SYSTEM WITH SHADOW GENERATION

TECHNICAL FIELD

The present invention relates generally to computer graphics generation and display, and more particularly, to a method and system for rendering a scene formed of at least one geometric primitive as a pixel image having a shadow(s) cast by another geometric primitive which is blocking the illumination of one or more defined light source(s).

BACKGROUND ART

The quality of computer graphics display system images and the time required to process these images have been steadily improving with each new generation of graphics display equipment. Continued improvement is clearly beneficial since images which approach photographic quality and project a real-world paradigm are much easier to interpret, while high speed processing allows more productive user interaction with displayed images. For example, currently available graphics display systems are able to provide highly interactive images with shading of displayed objects. Screen shading accurately models the surface effects of different types of lighting sources on displayed objects and the shading effects provide visible cues as to the shape and contours of the objects. Much of the processing required to produce shading effects is done in hardware which interpolates colors between polygon vertices, e.g., using a well known technique such as Gouraud Shading.

Other visual cues such as surface textures, motion blur, object reflections and shadows can also be added an image to further improve its quality. However, these enhancements traditionally require extensive software processing cycles, which make the graphics system less user interactive. The present invention specifically addresses improving the processing time for one of these enhancements, namely, generating shadows cast when objects block the illumination of one or more defined light sources in a scene to be rendered.

Typical computer graphics systems are capable of determining the surface color of an object at a given pixel and whether a pixel is visible from a defined viewpoint, and therefore whether the pixel belongs in the associated frame buffer. To accomplish this it is necessary to perform an interpolation of R, G, B and Z in X, Y space (six-axis interpolation). Since any information as to the positional relationship between light sources and objects is discarded by the geometry processing engine of the graphics system after the lighting calculation step, it is impossible for the subsequent raster processing sub-system to determine if an object casts a shadow on another object to appear in the pixel image.

As described by P. Bergeron in an IEEE September, 1986 publication entitled "A General Version of Crow's Shadow Volumes" (pp. 17–28), there are presently five known classes of shadow generation algorithms. Namely:

(1) Shadow computation during display (A. Appel, "Some Techniques for Shading Machine Renderings of Solids," Proc. Spring Joint Computer Conference, Thompson Books, Washington, DC, pp. 37–45, 1968);

(2) Polygon shadow generation based on clipping transformation (Atherton and Weiler, "Polygon Shadow Generation," Computer Graphics, (Proc SIGGRAPH 78) Vol. 12, No. 3, pp. 275–281, July 1978;

(3) Shadow volumes (F. Crow, "Shadow Algorithms for Computer Graphics," Computer Graphics (Proc. SIGGRAPH 77) Vol. 11, No. 3, pp. 242–248, July 1977;

(4) Z-buffer shadow computation (L. Williams, "Casting Curved Shadows on Curved Surfaces," Computer Graphics, (Proc. SIGGRAPH 78), Vol. 12, No. 3, pp. 270–274, July 1978; and (5) Ray tracing (see Whitted, "An Improved Illumination Model for Shaded Display," Comm. ACM, Vol. 23, No. 6, pp. 343–349, June 1980).

Of the above techniques, only the Z-buffer algorithm approach described by L. Williams operates in image space and allows a scene of any complexity to be handled. Briefly described, the Williams shadow generation method utilizes two passes through a Z-buffer algorithm, one for a viewer and one for a light source. Determination of whether a surface is to be shadowed is made by using image-precision calculations.

The Williams algorithm begins by calculating and storing just the Z-buffer values for an image from the perspective of the light source, wherein increasing values represent increasing distance. Next, the Z-buffer and the image are calculated from the viewpoint of an observer using a Z-buffer algorithm with the following modification. Whenever a pixel is determined to be visible, its object-precision coordinates in the observer's view $(X_O, Y_O, Z_O)$ are each computationally transformed into coordinates in the light source's view $(X'_O, Y'_O, Z'_O)$ The transformed coordinates $X'_O$ and $Y'_O$ are used to select a value $Z_L$ in the light source's Z-buffer to be compared with the transformed value $Z'_O$. If $Z_L$ is closer to the light source than is $Z'_O$, then there is something blocking the light from that point, and the pixel is shaded as being in shadow; otherwise, the point is visible from the light and it is shaded as being lighted. This computationally intensive approach requires extensive transformation calculations between the light source and viewpoint view coordinates for each pixel. Because of these computations, user interactiveness with the computer graphics system is less than optimal, and degrades significantly with the addition of a second or more light source.

Thus, a need continues to exist in the computer graphics processing art for a new shadow generation technique which solves the shadow generation problem in image space and improves upon the performance of previous shadowing approaches.

DISCLOSURE OF INVENTION

Briefly described, this invention provides a computer graphics display method and system for rendering a scene formed of at least one geometric primitive as a pixel image with shadow(s) resulting from other object blocking illumination from one or more defined light sources. The graphics display system includes a first Z-buffer, a second Z-buffer and a frame buffer, each of which has storage locations corresponding to the pixels which are to form the image. The image has a defined viewpoint and at least one light source, such that each primitive is represented by one or more pixels (X,Y) relative to the defined viewpoint and one or more pixels (Xs,Ys) relative to the defined light source. In one embodiment, the image rendering method includes the of: for each pixel (X,Y), generating a first depth value (Z)

representative of the depth from the defined viewpoint to that pixel and saving the first depth value in the corresponding pixel location of the first Z-buffer if the first depth value (Z) is visible to the defined viewpoint in comparison with the depth value stored in the corresponding pixel location of the first Z-buffer; for each pixel (Xs,Ys), generating a second depth value (Zs) representative of the depth of the pixel to the defined light source and saving the second depth value (Zs) in the corresponding pixel location of the second Z-buffer if the second depth value (Zs) is visible to the light source in comparison with a depth value stored in the corresponding pixel location of the second Z-buffer; and for each pixel forming the pixel image, generating, using only the defined light source, a representative color value (Rs,Gs,Bs) and adding to a corresponding (X,Y) pixel location of the frame buffer the representative color value (Rs,Gs,Bs) for the pixel if the corresponding depth value in the first Z-buffer identifies a pixel visible to the viewpoint and if the corresponding depth value in the second Z-buffer identifies a pixel visible to the light source. Further specific method details and enhancements are also described and claimed.

In another aspect, the invention provides a computer graphics display system with shadow generation capability for rendering a scene formed of at least one geometric primitive as a pixel image. The scene to be rendered includes a defined ambient lighting value, viewpoint and light source such that each primitive has one or more pixel (X,Y) associated therewith in a first, viewpoint coordinate space, and one or more pixel (Xs,Ys) associated therewith in a second, light source coordinate space. The graphics display system includes a geometry processing engine for converting at least one geometric primitive into device X,Y,Z coordinates relative to the viewpoint and device Xs,Ys,Zs coordinates relative to the light source. A frame buffer, first Z-buffer and second Z-buffer are also provided, each of which has storage locations corresponding to the pixels forming the image of the rendered scene. A raster processing engine is coupled to receive the output of the geometry processing engine, and is also coupled to the frame buffer, first Z-buffer and second Z-buffer for controlling the storage of values thereto. The raster processing engine includes: first storage means which directs the storage of pixel depth values in the first Z-buffer whenever a determined pixel depth value (Z) is equal or closer to the viewpoint than a depth value already stored in the corresponding pixel location of the first Z-buffer; second storage means which directs the storage of second pixel depth values (Zs) in the second Z-buffer whenever a determined depth value (Zs) is equal or closer to the light source than a depth value already stored in the corresponding pixel location of the second Z-buffer; generating means for producing a representative color value (Rs,Gs,Bs) for each pixel forming the image using only the defined lighting source; and accumulating means for adding to the corresponding (X,Y) pixel location of the frame buffer the generated representative color value (Rs,Gs,Bs) for the pixel if the corresponding depth value in the first Z-buffer identifies a pixel visible to the viewpoint and the corresponding depth value in the second Z-buffer identifies a pixel visible to the light source.

To summarize, the present invention comprises a shadow generation approach which advantageously enhances processing times in comparison with known shadow rendering techniques, so that user interactiveness with the graphics system is optimized. shadow generation approach, which is substantially implemented in hardware, maintains a mapping between a viewpoint and a light source by interpolating the respective Z-buffer addresses into dual Z-buffers during the span generation process. Since shadows are useful for visualizing the spatial relationship among objects, use of the invention provides another significant visual cue to interpreting a rendered scene, while still maintaining low computational overhead.

Shadow processing pursuant to the invention has a performance comparable to the non-shadowed rendering of Gouraud shaded polygons with hidden surfaces removed. Novel characteristics include the use of nine-axis interpolation instead of the traditional six-axis, the accommodation of multiple light sources through a simple technique of multiple passes over the scene, and correction of depth buffer registration errors by Z displacement in the direction of a light source view gradient in Xs,Ys space (i.e., light source view coordinates).

BRIEF DESCRIPTION OF DRAWINGS

These and other objects, advantages and features of the present invention will be more readily understood from the following detailed description of certain preferred embodiments of the present invention, when considered in conjunction with the accompanying drawings in which:

FIGS. 4A, 4B, 4C1 & 4C2 comprise a flowchart representation of one embodiment of pixel image processing pursuant to the computer graphics display system of FIG. 3.

BEST MODE FOR CARRYING OUT THE INVENTION

Reference is now made to the drawings in which the same reference numbers are used throughout the different figures to designate the same or similar components.

Figure 1:
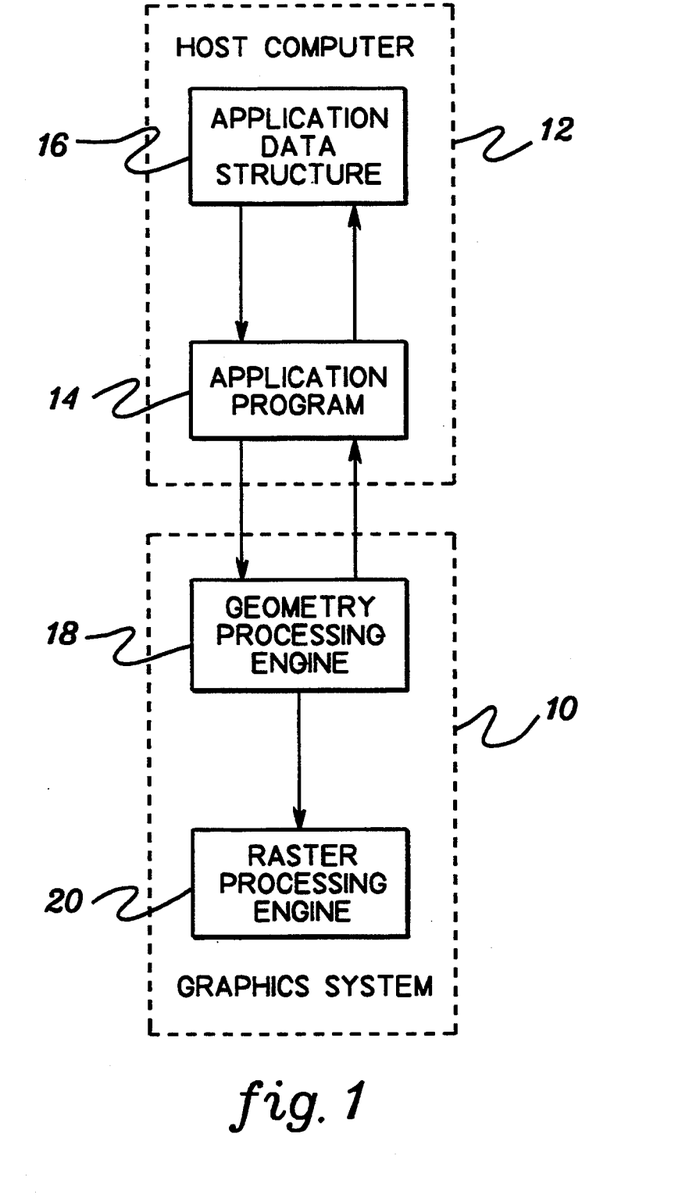
FIG. 1 is a general block diagram representation of an interactive computer graphics display system to incorporate the present invention.

In FIG. 1, a general block diagram representation of the interaction between a graphics system 10 and a host computer 12 is shown. Computer 12 includes an application program 14 and an application data structure 16. Application program 14 stores into and retrieves data from application data structure 16 and sends graphics commands to graphics system 10. Data structure 16 holds descriptions of real or abstract figures or objects which are to appear on a graphics monitor (not shown) associated with system 10. An object description stored within data structure 16 comprises geometric coordinate data which defines the shape of components of the object, object attributes, and connectivity relationships and positioning data that define how the components fit together. For example, objects are commonly defined by geometric primitives or polygons, such as quadrilaterals or triangles.

Graphics system 10 includes a geometry processing engine 18 and a raster processing engine 20 coupled thereto. Engines 18 & 20 comprise separate subsystems, each of which typically includes multiple pipelined or parallel connected processors. Engine 18 conventionally implements floating point geometry processing to convert information from modeling or world coordinates and colors to screen coordinates and colors through several well known processing steps, including tessellation, lighting calculation, clipping, transformation, mapping, etc. Certain of these processing steps are discussed further below as they relate to the present invention. Raster processing engine 20 traditionally implements a scan conversion operation wherein individual pixels are integer processed (e.g., through an edge processor and a span processor coupled thereto) for ultimate screen display.

Figure 2:
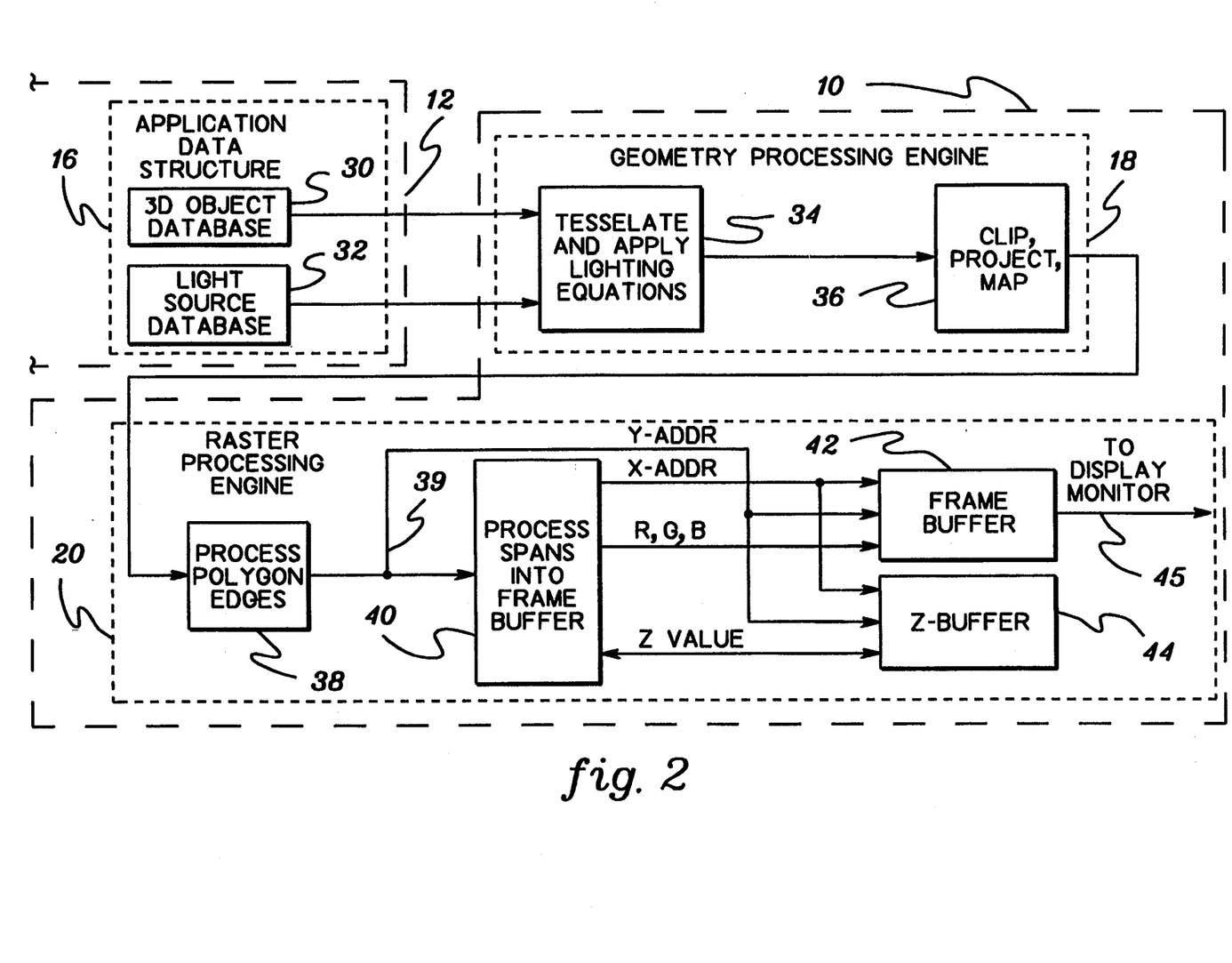
FIG. 2 is a block diagram representation of a conventional computer graphics display system.

To facilitate a description of the unique structure/function of a shadow generation unit in accordance with the present invention, the operation of a typical shaded solid rendering system (which includes a geometry processing engine 18 and a raster processing engine 20) is initially discussed with reference to the structural/functional blocks of FIG. 2.

Information in an associated application data structure 16, including a 3D object database 30 and a light source database 32, is retrieved by geometry processing engine 18 of graphics system 10. Objects in a three-dimensional scene to be two-dimensionally represented are typically composed of surface polygons or specified in a functional or parametric way such as B-spline surfaces. Information such as X,Y,Z vertices in world coordinates and normals to the provided surfaces are commonly included. Engine 18 tessellates the provided information and implements well known lighting equations (e.g., Gouraud shading) using retrieved, predefined ambient, diffuse and specular lighting components.

During the lighting calculation process 34, the color and intensity at each vertex is determined by lighting equations which consider object and ambient/light source color, direction of any light vector, surface and/or vertex normals, and the direction of the reflection vector if specular highlights are desired. Output in world coordinates from block 34 are polygon data vertices (X,Y,Z) and lighting intensity levels (R,G,B). This information is then clipped, projected and mapped at process block 36 to the desired viewport in screen coordinates.

Input to raster processing engine 20 are the polygon vertices specified as integer X,Y,Z coordinates in screen space, and the R,G,B components of intensity. This information is fed to edge processing 38 which decomposes each triangle, for example, into a series of horizontal spans by interpolating the X,Z,R,G and B values with respect to Y between the vertices. Each span on a given scan line (Y value) consists of X(l) and X(r) (i.e., the horizontal left (l) and horizontal right (r) limits of the span), R,G,B and Z at the left edge and the partial derivatives of R,G,B and Z with respect to X (dR/dX, dG/dX, dB/dX, dZ/dX) as determined from the plane equation. The Y address (Y-ADDR) is made directly available to a frame buffer 42 and a Z-buffer 44 via line 39. A span processing operation 40 decomposes each horizontal span into individual pixels (and considers storing of intensity values to frame buffer 42) according to the following process:

```
R(X(l),Y) = R(l)
G(X(l),Y) = G(l)
B(X(l),Y) = B(l)
Z(X(l),Y) = Z(l)
For X = X(l)+1 to X(r)
    R(X,Y) = R(X−1,Y) + dR/dX
    G(X,Y) = G(X−1,Y) + dG/dX
    B(X,Y) = B(X−1,Y) + dB/dX
    Z(X,Y) = Z(X−1,Y) + dZ/dX
    If ( Z(X,Y) > Z-BUFFER(X,Y) )
    Then
        Update R(X,Y), G(X,Y), B(X,Y), Z-BUFFER(X,Y).
```

The derived X address (X-ADDR) is made available to both frame buffer 42 and Z-buffer 44, while the derived intensity values (R,G,B) are available only to buffer 42 and the computed Z depth value (Z VALUE) only to Z-buffer 44.

Frame buffer 42 and Z-buffer 44, which can be accessed in parallel, each have a single entry for each (X,Y) pixel address. The comparison (Z(X,Y)>Z-BUFFER (X,Y)) ensures that only the pixels in a triangle that are closest to a viewer are written to frame buffer 42 after the entire scene has been processed. Typically, one pass through the data structure is sufficient to render a scene with light source shading of objects and hidden surface removal. Also, the order of processing is generally irrelevant, so no sorting of data is required. The calculation of R,G,B and Z as a function of X and Y, is referred to in the art as 6-axis interpolation, since each vertex represents a point in 6-space. Buffer 42 is used to refresh a display monitor (not shown) via line 45.

Of the known classes of shadow generation algorithms (see Background section), most if not all, are implemented in the geometry processing phase of the graphics system. For example, see the Z-buffer shadow computation approach described by L. Williams in the above-referenced article, entitled "Casting Curved Shadows on Curved Surfaces." Such an approach, however, is similar to having dual pipelines and managing them simultaneously. Obviously, with the addition of multiple light sources the image-precision calculations of the Williams approach quickly become too complex.

In contrast to most previous shadowing approaches, the present inventive shadowing technique is implemented within the raster processing sub-system of the graphics unit. The approach is functionally similar in several ways to that described above with respect to FIG. 2, however, a second Z-buffer is added to track pixel depth of geometric primitives relative to one or more discrete light sources applied to the scene to be represented. Multiple passes are made through the data structure for each light source capable of producing shadows in the scene. An overview of this technique is next discussed with reference to FIG. 3, which depicts a modified structural/functional graphics system pursuant to the present invention.

Figure 3:
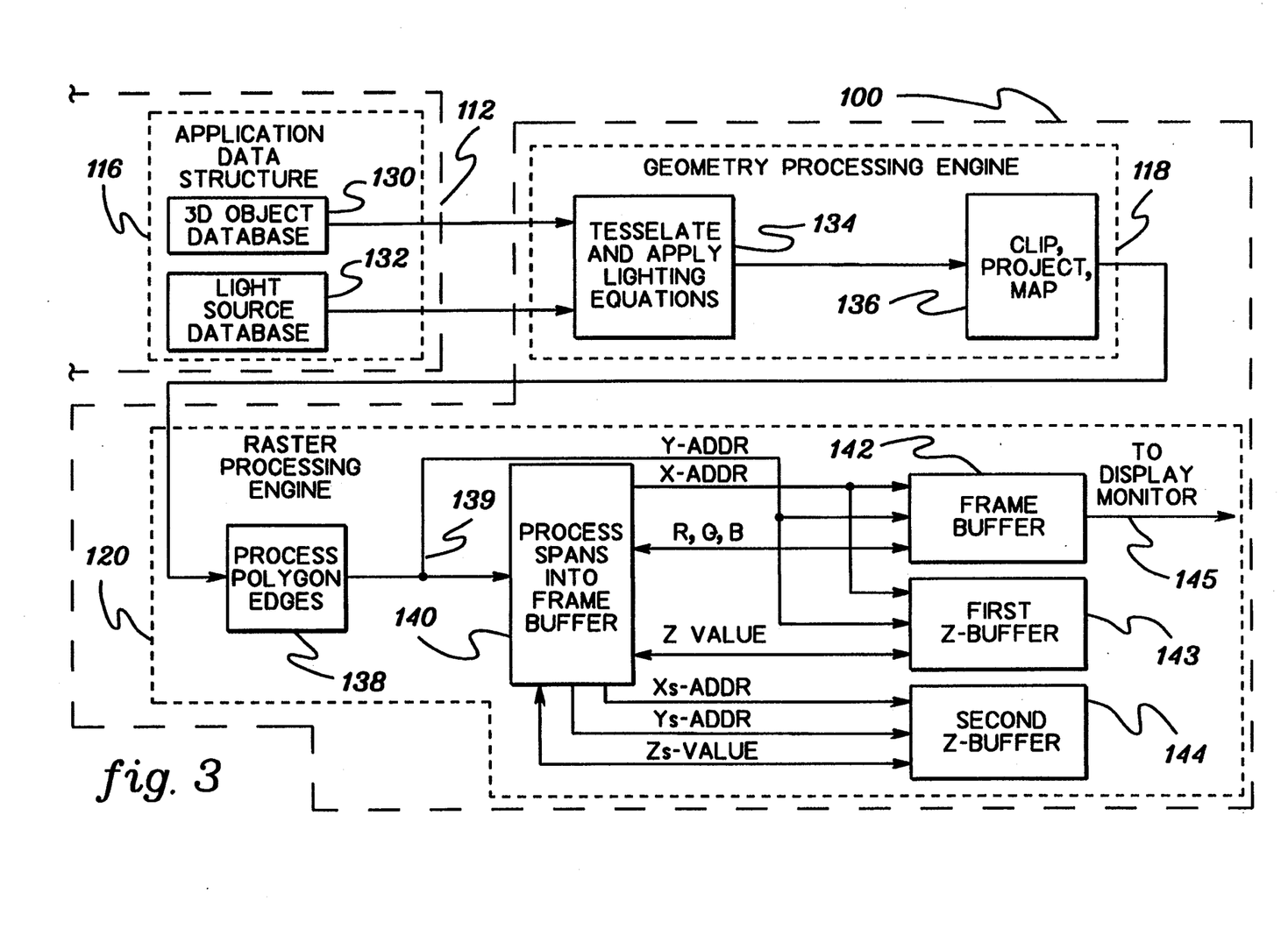
FIG. 3 is a block diagram representation of a computer graphics display system pursuant to the present invention.

As shown, information from an associated application data structure 116 (including a 3D object database 130 and a light source database 132) of a host computer 112 is initially fed to a geometry processing engine 118 of graphics system 100. System 100 also includes a raster processing engine 120 coupled to engine 118. Operationally engine 118 begins processing by tessellating and applying lighting equations 134 to the retrieved data. In addition to forwarding, for example, polygon data vertices X,Y,Z in world cooriditates and color intensities R,G,B to the clip, project and map function 136 of engine 118, function block 134 also generates polygon data vertices Xs,Ys,Zs in world coordinates. Vertices Xs,Ys,Zs represent the retrieved data vertices defined in relation to the light source(s) applied to the scene to be rendered, i.e., polygon data vertices Xs,Ys,Zs are generated in each of one or more light source view coordinates Xs,Ys,Zs (wherein s=1, . . . N light sources).

A second Z-buffer 144 is provided pursuant to the present invention for accommodating Zs values representative of the pixel depth from the point of view of a predefined light source rather than from a viewer. The pixel addresses to the second Z-buffer (i.e., the light source view buffer) are designated Xs,Ys and are not the same X,Y pixel addresses which access a framebuffer 142 and a first Z-buffer 143 (i.e., viewpoint Z-buffer).

As described further below, the shadow generation algorithm set forth herein operates by taking multiple passes over the data, depending upon the number of light sources in the scene. In a first pass, the scene is rendered to the frame-buffer in the usual way, updating the first Z-buffer with the viewpoint Z-value, but using only the ambient component of the light specification to determine the corresponding color values R,G,B to be stored. Other than using only ambient light in the lighting calculation, first pass processing is essentially as described above with reference to FIG. 2.

Input to raster processing engine 120 are the polygon vertices specified as integer X,Y,Z coordinates and Xs,Ys,Zs coordinates in screen space, and the R,G,B components of intensity due to the defined lighting.

This information is fed to polygon edge processing 138 which decomposes each triangle, for example, into a series of horizontal spans by interpolating the X,Z,Xs,Ys,Zs,R,G & B values with respect to Y between the vertices. Each span on a given scan line (Y value) consists of X(l) and X(r) (i.e., the horizontal left (l) and horizontal right (r) limits of the span), R,G,B,Z,Xs,Ys & Zs at the left edge and the partial derivatives of Z,R,G,B,Xs,Ys & Zs with respect to X as determined from the plane equation. The Y address (Y-ADDR) is made directly available to frame buffer 142 and first Z-buffer 143 via line 139. A span processing operation 140 subsequently decomposes each horizontal span into individual pixels as described further below. Buffer 142 is used to refresh a display monitor (not shown) via line 145.

After completing the first pass, the frame-buffer contains the scene as it would appear if no specific light sources, besides ambient lighting, were identified. The resultant screen image appears dim. The first Z-buffer (viewpoint Z-buffer) contains the Z values for the pixels which represent the closest points to the viewer in viewpoint coordinate space.

For each defined light source, two additional processing passes through the data structure are required. In the first of these, a transformation matrix is set up in such a way that the viewpoint is moved to the position of a light source. The scene is then rendered in the usual way except that the framebuffer is not updated, and the second, light source view Z-buffer is used instead of the first, viewpoint view Z-buffer.

Span processing in engine 120 is represented as:

```
Z(X(l),Y) = Z(l)
```

```
For X = X(l)+1 to X(r)
    Z(X,Y) = Z(X−1,Y) + dZ/dX
    If ( Z(X,Y) > SECOND_ZBUFFER(X,Y) )
    Then
        Update SECOND_ZBUFFER(X,Y)
```

In the next pass, the shaded image and shadows are generated in parallel. The transform/clip/map process 136 generates vertex data relative to both the light source and the viewpoint, and the lighting calculations generate the intensity based on the diffuse and the specular components of the subject light source with no ambient lighting considered. Input to edge processing then consists of triangles with 9-valued vertices, and interpolation proceeds in 9-space. In particular, each vertex consists of:

X—screen space X coordinate (from viewpoint)
Y—screen space Y coordinate (from viewpoint)
Z—screen space Z coordinate (from viewpoint)
R—red component of intensity for light
G—green component of intensity for light
B—blue component of intensity for light
Xs—screen space X coordinate (from light source)
Ys—screen space Y coordinate (from light source)
Zs—screen space Z coordinate (from light source)

Edge processing is similar to that described above with respect to FIG. 2, with the addition of edge and derivative calculations for Xs,Ys,Zs (i.e., dXs/dX,dYs/dX,dZs/dX). As noted, a span now consist of X(l) and X(r), the left edge values of R,G,B,Z,Xs,Ys,Zs and the partial derivatives of R,G,B,Z,Xs,Ys and Zs with respect to X. These can all be generated from the plane equations in X and Y.

Span processing proceeds by interpolating R,G,B,Z,Xs,Ys,Zs between X(l) and X(r), using both the first and second Z-buffers 143 & 144, respectively, to decide whether to update the frame buffer 142. Since processing only involves the diffuse and specular components for one light source, a compare in the second Z-buffer (light source view Z-buffer) that indicates a no write condition corresponds to a shadow, with only the ambient background remaining in the frame buffer. When the frame buffer is updated, it is accomplished in a cumulative manner with each computed intensity value being added to the value already there. In this way, multiple light sources are accumulated on the image. As displayed on the monitor (not shown), the visual effect after each light source is processed is of turning a light "on". The algorithm for span processing on the third pass is:

```
R(X(l),Y) = R(l)
G(X(l),Y) = G(l)
B(X(l),Y) = B(l)
Z(X(l),Y) = Z(l)
Xs(X(l),Y) = Xs(l)
Ys(X(l),Y) = Ys(l)
Zs(X(l),Y) = Zs(l)
For X = X(l)+1 to X(r)
    R(X,Y) = R(X−1,Y) + dR/dX
    G(X,Y) = G(X−1,Y) + dG/dX
    B(X,Y) = B(X−1,Y) + dB/dX
    Z(X,Y) = Z(X−1,Y) + dZ/dX
    Xs(X,Y) = Xs(X−1,Y) + dXs/dX
    Ys(X,Y) = Ys(X−1,Y) + dYs/dX
    Zs(X,Y) = Zs(X−1,Y) + dZs/dX
    If ( Z(X,Y) >= FIRST_ZBUFFER(X,Y) ) and
```

-continued

```
( Zs(X,Y) >= SECOND_ZBUFFER(Xs,Ys) )
Then
    Rframebuffer(X,Y) = R(X,Y) + Rframebuffer(X,Y)
    Gframebuffer(X,Y) = G(X,Y) + Rframebuffer(X,Y)
    Bframebuffer(X,Y) = B(X,Y) + Rframebuffer(X,Y)
```

A more specific explanation of the processing technique of the present invention is next described with reference to the functional flowcharts of FIGS. 4A, 4B, 4C1 & 4C2.

Figure 4A:
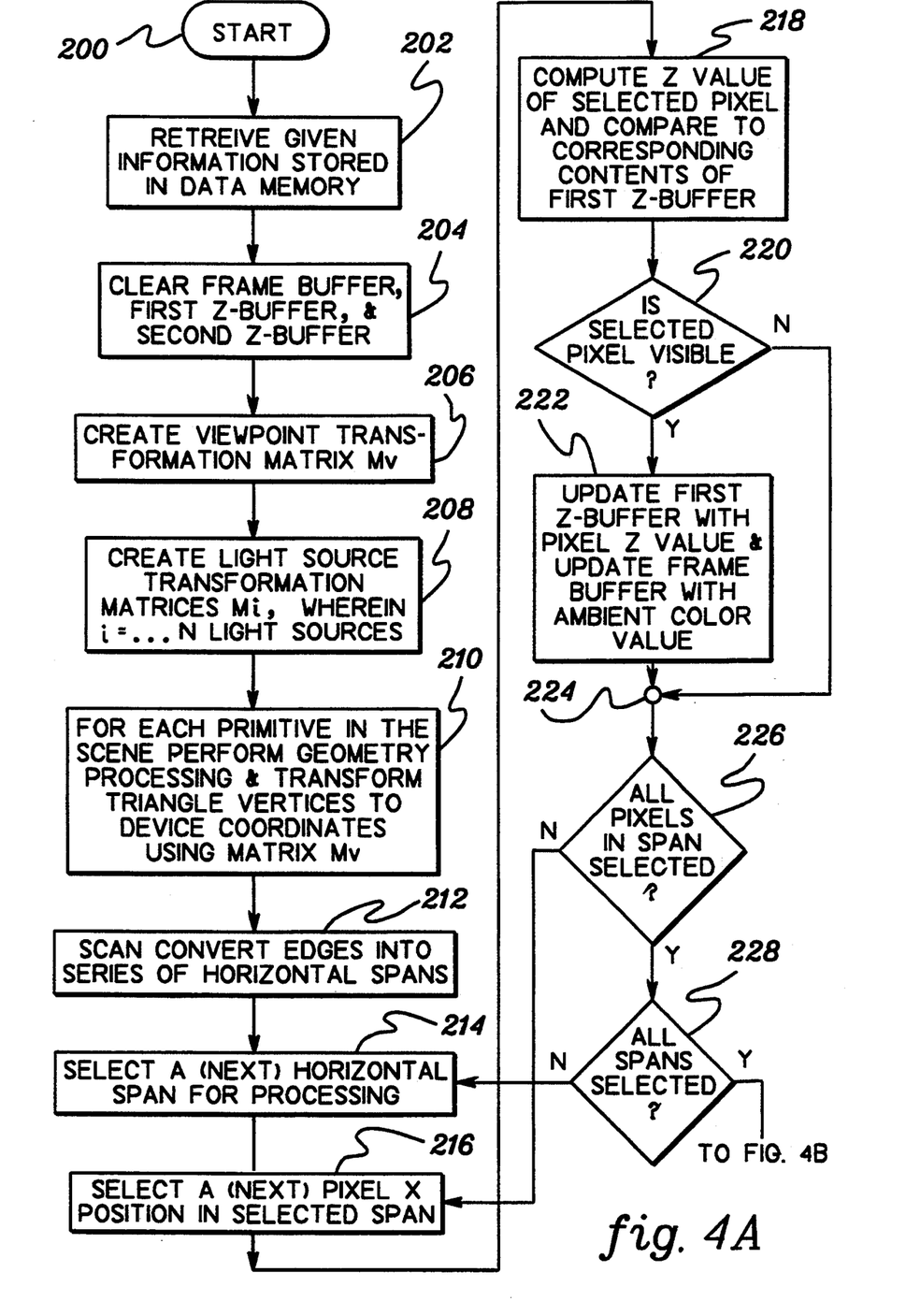

Referring first to FIG. 4A, upon initiating processing, 200 "Start," input information stored in data memory is retrieved, 202 "Retrieve Given Information Stored In Data Memory." Stored information typically includes a list of 3D geometric primitives (polygons, surfaces, etc.) and their attributes (color, surface properties, etc.) which compose the scene to be rendered, specified in or transformable to world coordinates. In addition, viewing information including position of the viewer in world coordinates, size and orientation of viewing window in world coordinates, screen viewport in device coordinates, clipping planes defined in world coordinates and the type of projection (i.e., orthogonal or perspective) are defined. Also, a list of N light sources and their attributes (color, spread, type, etc.) and position (or light ray direction if infinite) are specified in world coordinates. Typically, an ambient light component is also predefined. The ambient light component simulates background light illuminating a surface totally in shadow, and is constant for every surface in the scene.

Next, the frame buffer, first Z-buffer and second Z-buffer are cleared, 204 "Clear Frame Buffer, First Z-Buffer, & Second Z-Buffer," and a viewpoint transformation matrix Mv is created 206 "Create Viewpoint Transformation Matrix Mv." Matrix Mv is used to transform the vertices of scene primitives in world coordinates to device coordinates viewed from the viewpoint position using the given window and viewport size and orientation. Thereafter, a light source transformation matrix Mi, wherein i=1 ... N is created for each of the N defined light sources, 208 "Create Light Source Transformation Matrix Mi, Wherein i=1 ... N Light Sources." For each light source, matrix Mi is used to transform the vertices of the scene primitives in world coordinates to device coordinates viewed from each light source position (i) through a suitable selection of a window and viewport mapping so as to place the total scene within the confines of the light source Z-buffer device coordinate range. One skilled in the art will understand how to implement such a selection.

The first processing pass (PASS 1) through the data structure begins with routine geometry processing and includes transformation of triangle vertices to device coordinates using matrix Mv, 210 "For Each Primitive In The Scene Perform Geometry Processing & Transform Triangle Vertices To Device Coordinates Using Matrix Mv." Typical geometric processing includes fetching the primitives from data memory, transforming vertices and control points to world coordinates (if necessary), tessellating primitives into planar polygons such as triangles (if necessary), performing a clipping test and (if necessary) clipping to a defined view volume. Each of these manipulations is well understood by those skilled in the art. Along with transforming triangle vertices to device coordinates using the matrix Mv, perspective division may be performed, again if required. After converting the vertices to device coordinates, edges are scan converted into a series of horizontal or vertical spans, 212 "Scan Convert Edges Into Series Of Horizontal Spans." This typically involves computation of Bresenham parameters or DDA slopes for scan converting of triangle edges and then scan converting the edges into end points of a series of horizontal (or alternatively vertical) spans.

Each X position in each horizontal span is next considered for computation and storage of Z values. This is accomplished by first selecting a horizontal span for processing, 214 "Select A (Next) Horizontal Span For Processing," after which a pixel X position in the selected span is selected, 216 "Select A (Next) Pixel X Position In Selected Span." A depth value for the selected pixel is computed and compared to the corresponding contents of the first Z-buffer, 218 "Compute Z Value Of Selected Pixel And Compare To Corresponding Contents of First Z-Buffer." Logical inquiry is then conducted into whether the selected pixel is visible to the viewpoint, 220 "Is Selected Pixel Visible?" If "yes" (meaning that the calculated Z value is closer to the eyepoint than the corresponding value in the first Z-buffer), then the Z-buffer value is replaced with the just calculated pixel Z value and the frame buffer pixel value is replaced with the corresponding ambient color value, 222 "Update First Z-Buffer With Pixel Z Value & Update Frame Buffer With Ambient Color Value."

From instruction 222 processing passes through junction 224 to inquire whether all pixels in the subject span have been processed, 226 "All Pixels in Span Selected?" (Alternatively, if the selected pixel is not visible to the viewpoint, processing proceeds directly from inquiry 220 through junction 224 to inquiry 226.) While the answer to inquiry 226 remains "no," processing continues to loop back to instruction 216 for selection of a next pixel X position in the selected span. Once all pixels in a selected span have been processed, inquiry is made into whether all spans have been selected for processing, 228 "All Spans Selected?" If "no," processing returns to instruction 214 for selection of a next horizontal span. If "yes," then first pass processing (PASS 1) through the data structure is complete and processing proceeds to FIG. 4B.

Figure 4B:
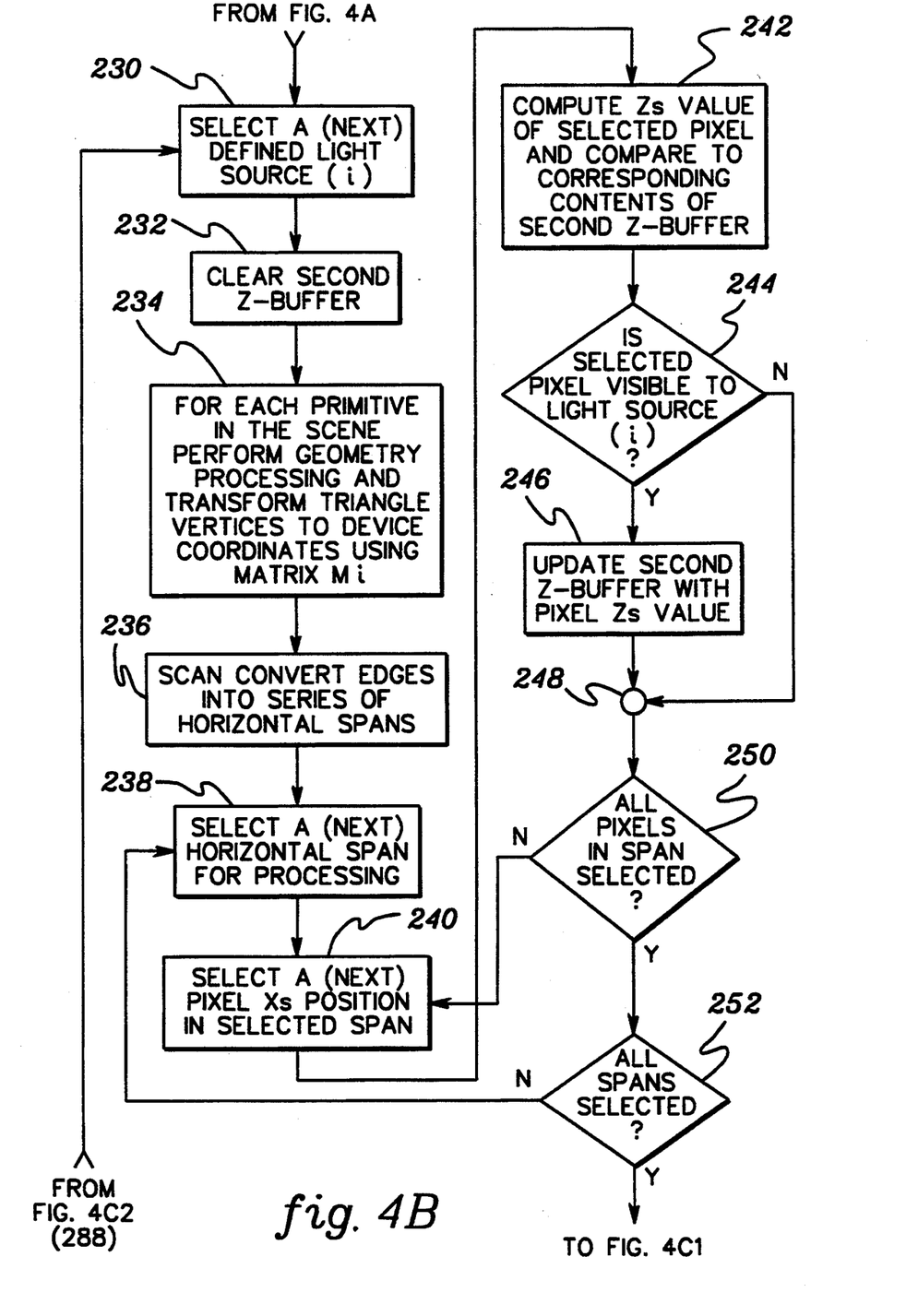
Figure 4C:
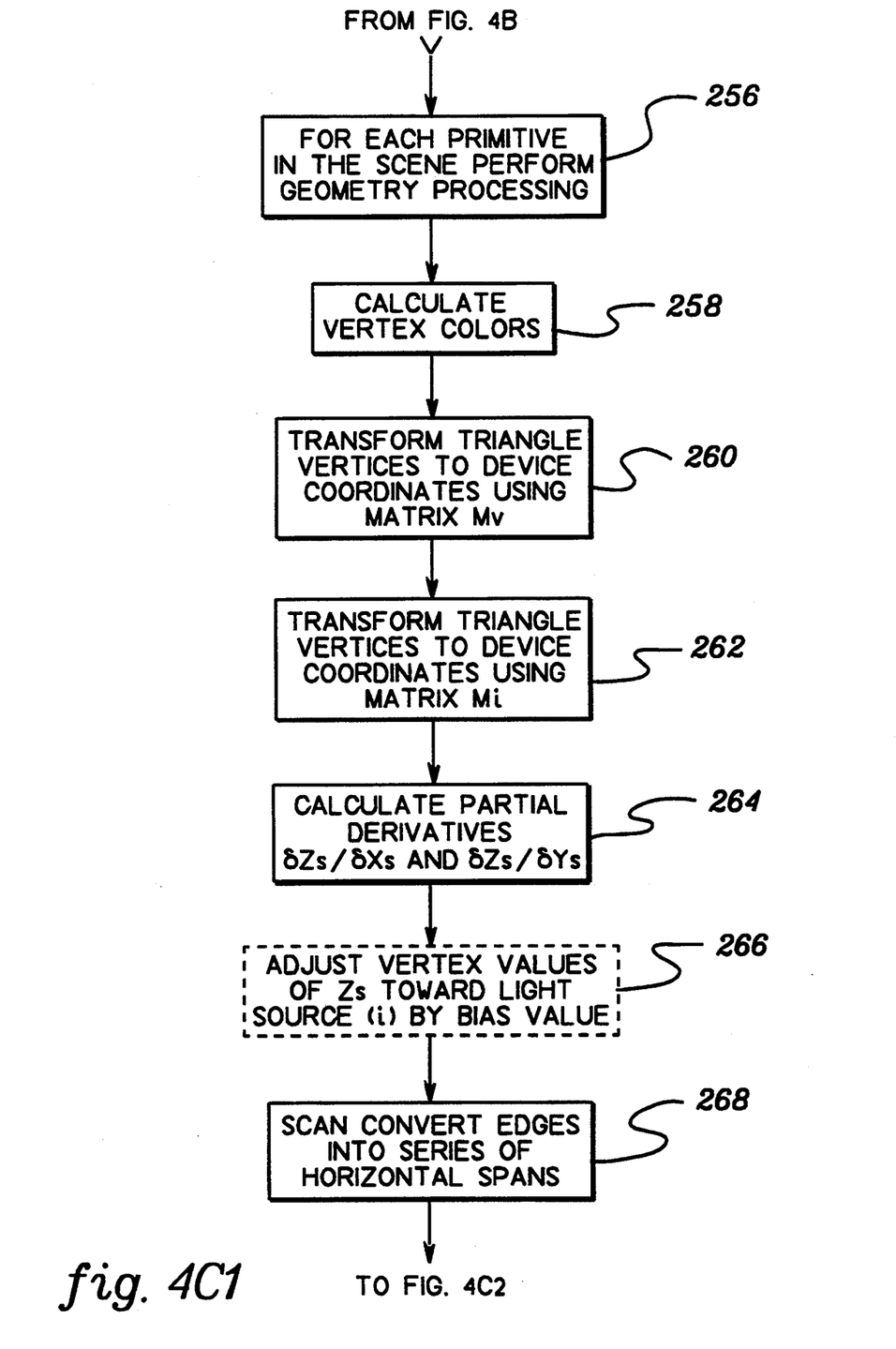
Figure 4C:
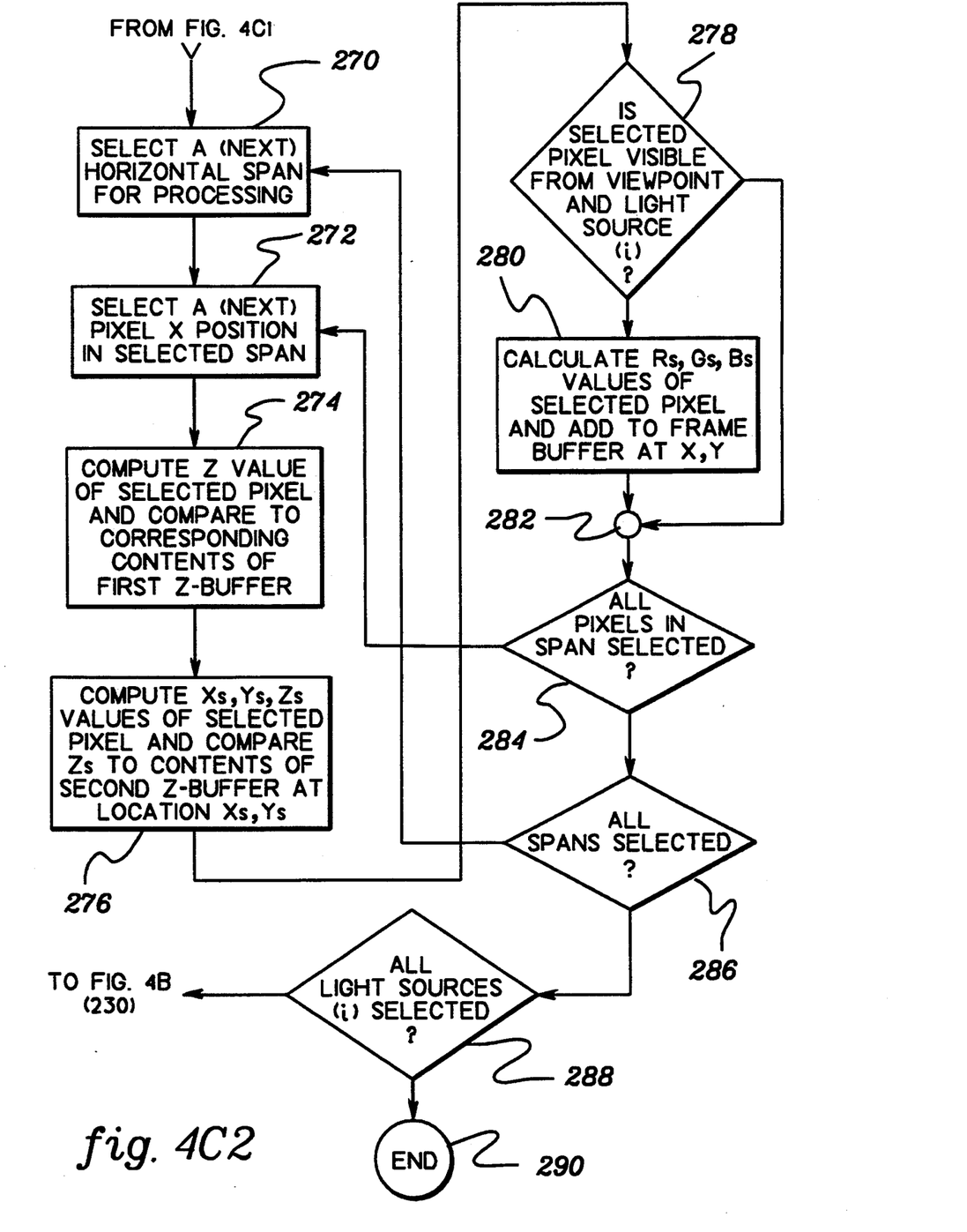

FIGS. 4B, 4C1 & 4C2 together represent the two novel passes through the data structure pursuant to the present invention which are to be accomplished in combination for each defined light source (i.e., PASS 2$i$ and PASS 2$i$+1, wherein i=1 ... N, and N equals the number of light sources).

Initially, a defined light source is selected, 230 "Select A (Next) Defined Light Source (i)," and the second Z-buffer is cleared, 232 "Clear Second Z-Buffer." Thereafter, for each primitive in the data structure the second pass (PASS 2$i$) includes performing geometry processing and transforming triangle vertices to device coordinates (i.e., light source view coordinates) using the corresponding matrix Mi, 234 "For Each Primitive In The Scene, Perform Geometry Processing And Transform Triangle Vertices to Device Coordinates Using Matrix Mi."

Again, geometry processing might include fetching a primitive from data memory, transforming vertices and control points to world coordinates (if necessary), tessellating primitives into planar polygons (if necessary), performing clip testing and clipping to a view volume (if necessary). Thereafter, edges are scan converted into a series of horizontal spans, 236 "Scan Convert Edges Into Series Of Horizontal Spans." Instruction 236 includes computing Bresenham parameters or DDA slopes for scan converting of the triangle edges and actual scan conversion of the triangle edges into end points of a series of horizontal (or alternatively vertical) spans.

Depth buffer processing similar to that conducted in FIG. 4A next occurs. Namely, a horizontal span for processing is initially selected, 238 "Select A (Next) Horizontal Span For Processing," and a pixel Xs position therein is identified, 240 "Select A (Next) Pixel Xs Position In Selected Span." The depth value of the selected Xs pixel is interpolated and compared to the stored value in the corresponding location of the second Z-buffer, 242 "Compute Z Value of Selected Pixel and Compare to Corresponding Contents of Second Z-Buffer." Inquiry is then made into whether the selected pixel is visible to the subject light source, 244 "Is Selected Pixel Visible To Light Source (i)?" If "yes," then the corresponding location in the second Z-buffer is updated with the just calculated pixel depth value Zs, 246 "Update Second Z-Buffer With Pixel Zs Value." Once updated, or if the subject pixel is not visible to the light source (e.g., its in shadow), processing passes through junction 248 to inquiry 250 "All Pixels In Span Selected?" Processing then continues to loop back to instruction 240 to select a next pixel Xs position in the selected span until all pixels in the span have been processed. Thereafter, inquiry is made whether all spans have been selected, 252 "All Spans Selected?" If "no," processing returns to instruction 238 where the next span is selected. Once all spans have been selected, the second pass is complete and processing passes to FIGS. 4C1 & 4C2 for a third pass (PASS $2i+1$) through the data structure.

Again, initial geometry processing is performed, 256 "For Each Primitive In The Scene Perform Geometry Processing." Processing includes fetching a primitive from data memory, transforming vertices and control points to world coordinates (if necessary), tessellating primitives into planar polygons (if necessary) and clipping to a view volume (if necessary). In addition, vertex normals are to be transformed to world coordinates, i.e., if not already therein. Thereafter, vertex colors are calculated, 258 "Calculate Vertex Colors." The colors are calculated from the specular and diffuse lighting equations only, using the primitive, surface and color attributes, the vertex normals, the viewing parameters and light source attributes. Next, triangle vertices are transformed to device coordinates using matrix Mv 260 "Transform Triangle Vertices to Device Coordinates Using Matrix Mv," and triangle vertices are also transformed to device coordinates using the subject light source matrix Mi, 262 "Transform Triangle Vertices to Device Coordinates Using Matrix Mi." The partial derivatives for the light source device coordinates are then calculated, 264 "Calculate Partial Derivatives dZs/dXs and dZs/dYs."

Figure 5:
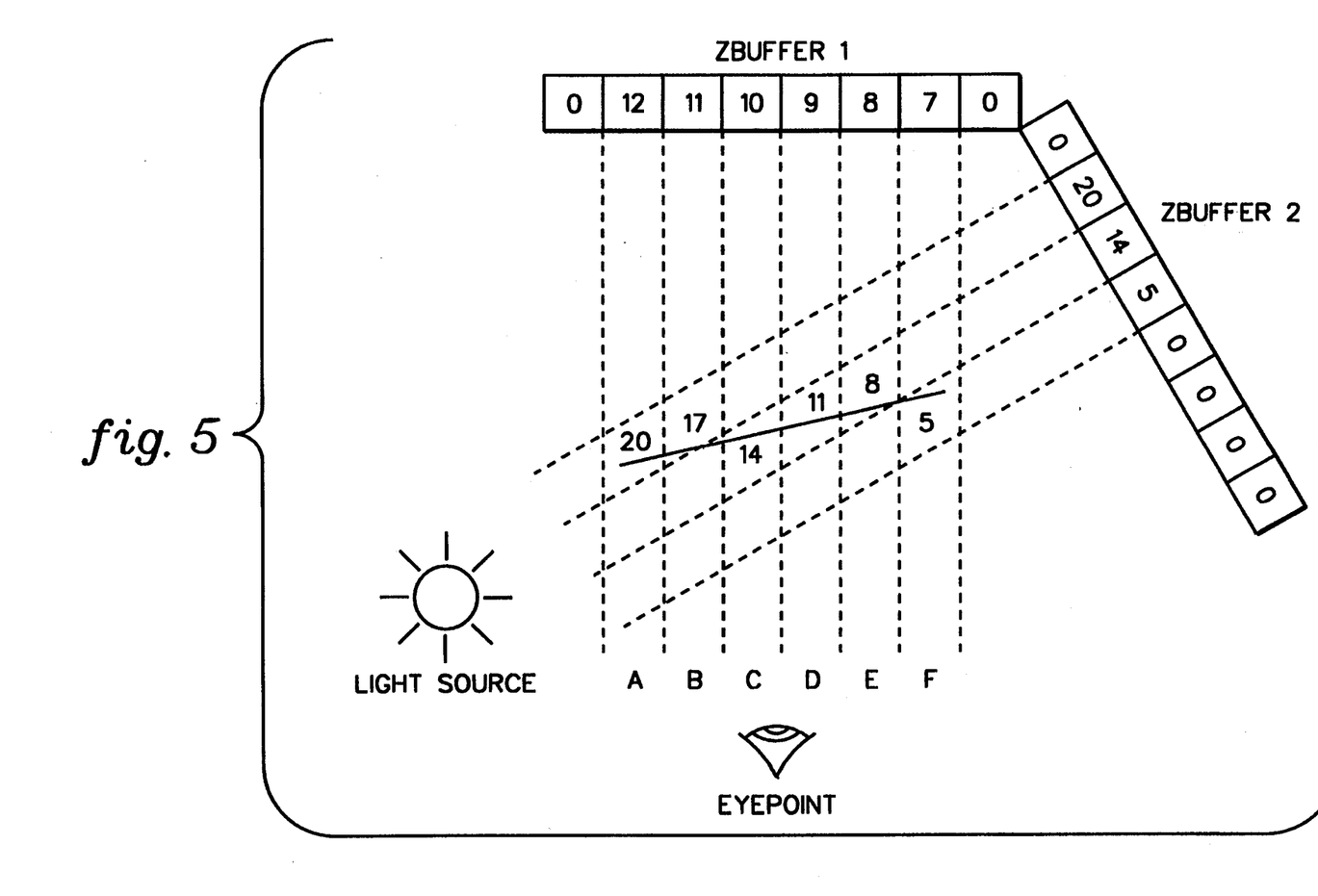
FIG. 5 graphically illustrates a potential problem arising with use of the computer graphics display system of FIG. 3, which is addressed by the pixel image processing method of FIGS. 4A–4C2.

Preferably, a processing step is inserted at this point whereby vertex values of Zs are adjusted toward the subject light source (i) by a bias value equal to the sum of the calculated derivatives. This is needed since the contents of the first Z-buffer and second Z-buffer represent two different view coordinates and the effective resolution of X and Y for the polygon edges will be different in certain cases; i.e., a range of pixels in X,Y space will not map to the same address in Xs,Ys space in the second Z-buffer. The problem is illustrated in FIG. 5. As shown therein, Z-buffer 1 accommodates Z values from the eyepoint view, while Z-buffer 2 contains Z values from a light source view. If the depicted effect is not considered, there will be certain pixels which will be erroneously processed as in shadow, as if shielded by a neighboring pixel(s). In FIG. 5, for example, pixel E has a Zs value of 8, but maps to Z-buffer 2 with a value of 14 (calculated when the Zs values are interpolated against Xs,Ys instead of X,Y). This pixel would be determined to be in shadow without some compensation.

The problem is not unique to the present invention, e.g., see the above-referenced Williams article. The solution presented therein was to add a bias to the calculated Zs values to prevent the effect when each point is transformed to the light source view. Since the present invention interpolates within the polygon rather than transforming each point, the bias is added to the Zs values of, for example, the triangle vertices. Furthermore, greater accuracy is obtained by calculating the biases as a function of the actual surface gradient of the polygon with respect to the light source viewpoint Xs,Ys plane. This yields a more accurate result then the constant bias proposed in the Williams article. In particular, when the edge processing function is calculating the derivatives for span generation, it also calculates the values of dZs/dXs and dZs/dYs, and adjusts the vertex Zs value by the sum of the derivatives. This has the effect of moving the triangle closer to the light source by its surface gradient in Xs and Ys and causes proper registration of the Xs,Ys plane.

Continuing with the third pass processing (PASS $2i+1$) of FIG. 4C1, scan conversion of edges into a series of horizontal spans next occurs, 268 "Scan Convert Edges Into Series of Horizontal Spans." This involves computation of the Bresenham parameters or DDA slopes for scan converting the triangle edges to produce X,Y,Z,R,G,B,Xs,Ys & Zs, and then scan converting of the triangle edges into the end points of a series of horizontal (or alternatively vertical) spans.

A pixel X position is identified by first selecting a horizontal span for processing, 270 "Select A (Next) Horizontal Span For Processing," and then selecting a pixel position within that span, 272 "Select A (Next) Pixel X Position In Selected Span." The Z value of the selected pixel is then computed and compared to the contents of the viewpoint depth buffer, 274 "Compute Z Value of Selected Pixel and Compare To Corresponding Contents of First Z-Buffer." Next, the Xs,Ys,Zs values of the selected pixel are computed/interpolated and the calculated Zs value is compared to the contents of the second Z-buffer at location Xs,Ys, 276 "Compute Xs,Ys,Zs Values of Selected Pixel and Compare Zs to Contents of Second Z-Buffer At Location Xs,Ys." Inquiry is then made into whether the selected pixel is visible from both the viewpoint and the subject light source (i), 278 "Is Selected Pixel Visible From Viewpoint and Light Source (i)?" If "yes," then the Rs,Gs,Bs values of the selected pixel are calculated and added to the frame buffer at X,Y, 280 "Calculate Rs,Gs,Bs Values of Selected Pixel and Add to Frame Buffer At X,Y." In other words, if the pixel is visible to both the eyepoint and the selected light source, then intensity values for the pixel are determined and added to the contents of the frame buffer at X,Y.

If either of the conditions in inquiry 278 are not met, or if met then after processing instruction 280, flow is through junction 282 to inquiry 284 "All Pixels In Span Selected?" If "no," then processing returns to instruction 272 where a next pixel X in the selected span is identified for processing. Once all pixels in a span have been processed, then inquiry is made into whether all spans have been processed, 286 "All Spans Selected?" If "no," processing loops back to instruction 270 where a next horizontal span is selected. Once all pixels and spans have been processed, inquiry is made whether all light sources have been selected, 288 "All Light Sources (i) Selected?" If "no," then processing returns to FIG. 4B at instruction 230, i.e., select a next defined light source (i) to accomplish PASSES $2i$, & $2i+1$. Once all light sources have been selected the frame buffer contains the sum of color intensities due to any ambient light and each of the defined light sources (i), including any shadows defined thereby, and processing is terminated, 290 "End."

It will observed form the above discussion that a unique shadow generation approach has been provided capable of efficiently handling multiple light sources. Significantly reduced processing times in comparison with prior shadow rendering techniques are attained, thereby improving user interactiveness with the graphics system. Shadow processing pursuant to the invention attains a performance comparable to non-shadowed, shaded polygons with hidden surfaces removed. The approach is implemented primarily in hardware and maintains a mapping between a viewpoint and a light source by interpolating the respective Z-buffer addresses into dual Z-buffers during span generation. Novel characteristics include the use of 9-axis interpolation instead of the traditional 6-axis, accommodation of multiple light sources through a simple technique of multiple passes over the scene, and correction of depth buffer registration errors by Z displacement in the direction of a light source view gradient in Xs,Ys space (light source view coordinates).

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

I claim:

1. In a computer graphics display system, a method for rendering a scene formed of at least one geometric primitive as an image with a shadow, said computer graphics display system including a first Z-buffer, a second Z-buffer and a frame buffer, said image having a defined viewpoint and a defined light source, each geometric primitive being a polygon with vertices, said vertices being represented by one or more pixels (X,Y) relative to said defined viewpoint and one or more pixels (Xs,Ys) relative to said defined light source, said first Z-buffer and said frame buffer having storage locations corresponding to said pixels (X,Y), and said second Z-buffer having storage locations corresponding to said pixels (Xs,Ys), said rendering method comprising the steps of:

(a) for each of said pixels (X,Y) representative of said at least one geometric primitive:
    (i) generating a first depth value (Z) representative of a depth from said defined viewpoint to said pixel, and
    (ii) saving said first depth value (Z) in the storage location of said first Z-buffer corresponding to said pixel if the first depth value (Z) defines a location equal or closer to said defined viewpoint than a depth value stored in said storage location of said first Z-buffer corresponding to said pixel;
  (b) for each of said pixels (Xs,Ys) representative of said at least one geometric primitive:
    (i) generating a second depth value (Zs) representative of a depth from said defined light source to said pixel, and
    (ii) saving said second depth value (Zs) in the storage location of said second Z-buffer corresponding to said pixel if the second depth value (Zs) defines a location equal or closer to said defined light source than a depth value stored in said storage location of said second Z-buffer corresponding to said pixel; and
  (c) for each of said pixels (X,Y) forming said image:
    (i) generating, using only said defined light source, a representative color value (Rs,Gs,Bs) for said pixel (X, Y),
    (ii) generating, using only said defined light source, interpolated values (Xs) and (YS) for said pixel (X,Y), and
    (iii) adding to a corresponding (X,Y) location of said frame buffer said representative color value (Rs,Gs,Bs) if the corresponding first depth value (Z) of said first Z-buffer identifies a pixel visible to said viewpoint and the corresponding second depth value (Zs) of said second Z-buffer identifies a pixel visible to said defined light source, said corresponding second depth value (Zs) being obtained by using said interpolated values (Xs) and (Ys).

2. The rendering method of claim 1, wherein said image to be rendered has a defined ambient lighting value and wherein said step (a) includes:
    (iii) generating, using only said defined ambient lighting value, a representative color value (R,G,B) for said pixel (X,Y) and storing said representative color value (R,G,B) in the storage location of said frame buffer corresponding to said pixel (X,Y).

3. The rendering method of claim 2, wherein said at least one geometric primitive is defined by a data structure of one or more polygons and wherein said generating step (a) (iii) includes scan converting said polygons into a series of pixel spans, each pixel span having end values, and placing for each pixel span said representative color value (R,G,B) from the end values of said pixel span for each pixel in said pixel span.

4. The rendering method of claim 1, wherein a plurality N of light sources are defined and each geometric primitive is represented by one or more pixels (Xs,Ys) (s=1,2 ... N) relative to each of said N defined light sources, and wherein said method further comprises the step of repeating said steps (b) & (c) in combination for each of said N defined light sources, said second Z-buffer being cleared prior to each combined repetition of said steps (b) & (c).

5. The rendering method of claim 1, wherein each of said at least one geometric primitive is defined in a data structure by one or more polygons and wherein said generating step (a) (i) includes scan converting said polygons into a series of pixel spans, each pixel span having end values, and interpolating for each pixel spank from the end values of said pixel spank said first depth value (Z) for each pixel in said pixel span.

6. The rendering method of claim 1, wherein each of said at least one geometric primitive is defined in a data structure by one or more polygons and wherein said generating step (b) (i) includes scan converting said polygons into a series of pixel spans, each pixel span having end values, and interpolating for each pixel span from the end values of said pixel span said second depth value (Zs) for each pixel in said pixel span.

7. The rendering method of claim 1, wherein said at least one geometric primitive is defined by a data structure of one or more polygons and said generating step (c) (i) includes scan converting said polygons into a series of pixel spans, each pixel span having end values, and interpolating for each pixel span said representative color value (Rs,Gs,Bs) from the end values of said pixel span for each pixel in said pixel span.

8. The rendering method of claim 1, wherein said at least one geometric primitive is defined by a data structure of one or more polygons, said polygons being defined by their vertices, and wherein said generating step (c) (i) includes adjusting the second depth value (Zs) at each of said polygon vertices relative to said defined light source to substantially eliminate any misregistration between said one or more pixels (X,Y) relative to said defined viewpoint and said one or more pixels (Xs,Ys) relative to said defined light source.

9. The rendering method of claim 1, wherein the order of said step (a) processing and said step (b) processing is interchangeable.

10. In a computer graphics display system having a geometry processing engine and a raster processing engine, a method for rendering a scene formed of at least one geometric primitive as an image, formed from pixels (X,Y), with a shadow, said at least one geometric primitive being defined by a data structure, said computer graphics display system further including a first Z-buffer, a second Z-buffer and a frame buffer, each of said buffers being coupled to said raster processing engine, said image having a defined ambient lighting value, viewpoint and light source such that each geometric primitive has one or more pixels (X,Y), representing vertices thereof, associated therewith in a first, viewpoint coordinate space, and each geometric primitive has one or more pixels (Xs,Ys), representing vertices thereof, associated therewith in a second, light source coordinate space, said first Z-buffer and said frame buffer having storage locations corresponding to said pixels (X,Y), and said second Z-buffer having storage locations corresponding to said pixels (Xs,Ys), said rendering method comprising the steps of:

(a) processing said data structure through said geometry processing engine and said raster processing engine of said computer graphics display system so as for each of said one or more pixels (X,Y), said engines:

(i) generate a first depth value (Z) representative of a distance from said defined viewpoint to said pixel, (ii) save said first depth value (Z) in the storage location of said first Z-buffer corresponding to said pixel if the first depth value (Z) is equal or closer to said defined viewpoint than a depth value stored in said storage location of said first Z-buffer corresponding to said Pixel, and (iii) determine, using only said defined ambient lighting, a representative color value (R,G,B) for said pixel and store said determined representative color value (R,G,B) at the storage location of said frame buffer corresponding to said pixel;

(b) processing said data structure through said geometry processing engine and said raster processing engine of said computer graphics display system so as for each of said one or more pixels (Xs,Ys), said engines:

(i) generate a second depth value (Zs) representative of a distance from said defined light source to said pixel, and (ii) save said second depth value (Zs) in the storage location of said second Z-buffer corresponding to said pixel if the second depth value (Zs) is equal or closer to said defined light source than a depth value stored in said storage location of said second Z-buffer corresponding to said pixel; and (c) processing said data structure through said geometry processing engine and said raster processing engine of said computer graphics display system so as for each pixel (X,Y) of said pixel image, said engines:

(i) calculate, using only said defined light source, a representative color value (Rs,Gs,Bs) for said pixel, (ii) calculate, using only said defined light source, interpolated values (Xs) and (Ys) for said pixel, and (iii) add to the storage location of said frame buffer corresponding to said pixel said representative color value (Rs, Gs,Bs) if the corresponding first depth value (Z) of said first Z-buffer identifies a visible pixel in said viewpoint coordinate space and the corresponding second depth value (Zs) of said second Z-buffer identifies a visible pixel in said light source coordinate space, said corresponding second depth value (Zs) being obtained by using said interpolated values (Xs) and (Ys).

11. The rendering method of claim 10, wherein said image has multiple defined light sources associated therewith, each of said defined light sources defining a separate light source view coordinate space, and wherein said method further includes repeating said steps (b) & (c) in combination for each of said multiple defined light sources such that for each pixel said frame buffer contains cumulative color intensities due to said defined ambient lighting and said multiple defined light sources.

12. The rendering method of claim 10, wherein each of said at least one geometric primitive is defined in said data structure by one or more polygons and wherein prior to said processing step (a) a viewpoint transformation matrix Mv is created, said generate step (a) (i) including for each geometric primitive transforming the polygons to device coordinates using said viewpoint transformation matrix Mv, scan converting said polygons into a series of pixel spans, each pixel span having end values, and interpolating from the end values of said pixel spans said first depth value (Z).

13. The rendering method of claim 10, wherein each of said at least one geometric primitive is defined in said data structure by one or more polygons and wherein prior to said processing step (b) a light source transformation matrix Mi is created, said generate step (b) (i) including for each geometric primitive transforming the polygons to device coordinates using said light source transformation matrix Mi, scan converting said polygons into a series of pixel spans, and interpolating from the end values of said pixel spans said second depth values (Zs).

14. The rendering method of claim 10, wherein each of said at least one geometric primitive is defined in said data structure by one or more polygons and wherein said calculate step (c) (i) includes scan converting said polygons into a series of pixel spans, each pixel span having end values, and interpolating for each pixel span said representative color value (Rs,Gs,Bs) from the end values of said pixel span for each pixel in said pixel span.

15. The rendering method of claim 10, wherein said at least one geometric primitive is defined in said data structure by one or more polygons, said polygons being defined by their vertices, and wherein said generate step (c) (i) includes adjusting the second depth value (Zs) at each of said vertices relative to said defined light source to substantially eliminate any misregistration between said one or more pixels (X,Y) in said viewpoint coordinate space and said one or more pixels (Xs,Ys) in said light source coordinate space.

16. A computer graphics display system with shadow generation capability for rendering a scene formed of at least one geometric primitive as an image, formed from pixels (X,Y), having a defined ambient lighting value, viewpoint and light source such that each geometric primitive has one or more of the pixels (X,Y) associated therewith representative of vertices in a first, viewpoint coordinate space, and one or more pixels (Xs,Ys) associated therewith representative of vertices in a second, light source coordinate space, said computer graphics display system comprising:
- a geometry processing engine for converting said at least one geometric primitive into device (X,Y,Z) coordinates relative to said defined viewpoint and into device (Xs,Ys,Zs) coordinates relative to said defined light source;
- a frame buffer having storage locations corresponding to the pixels forming said image for receiving representative pixel color values;
- a first Z-buffer having storage locations corresponding to the pixels forming said image for storing first depth values (Z) representative of the depth of selected pixels (X,Y) in said image relative to said defined viewpoint;
- a second Z-buffer having storage locations corresponding to the pixels forming said image for storing second depth values (Zs) representative of the depth of selected pixels (Xs,Ys) in said image relative to said defined light source;
- a raster processing engine coupled to receive the device coordinates output from said geometry processing engine and coupled to each of said frame buffer, first Z-buffer and second Z-buffer, said raster processing engine including:
  (i) means for generating for each pixel (X,Y) associated with said at least one geometric primitive a pixel depth value (Z) and for storing said pixel depth value (Z) in a corresponding (X,Y) location of said first Z-buffer when said pixel depth value (Z) is equal or closer to said defined viewpoint than a depth value stored in said storage location of said first Z-buffer corresponding to said pixel,
  (ii) means for generating for each pixel (Xs,Ys) associated with said at least one geometric primitive a second pixel depth value (Zs) and for storing said second pixel depth value (Zs) in a corresponding (Xs,Ys) location of said second Z-buffer when said second pixel depth value (Zs) is equal or closer to said defined light source than a depth value stored in said storage location of said second Z-buffer corresponding to said pixel,
  (iii) means for generating a representative color value (Rs,Gs,Bs) for each pixel forming said image using only said defined light source,
  (iv) means for generating interpolated values (Xs) and (Ys) for each said pixel, and
  (v) means for adding to a corresponding (X,Y) pixel location of said frame buffer each of said generated representative color values (Rs,Gs,Bs) for said pixels if the corresponding depth value in said first Z-buffer identifies a pixel visible to said defined viewpoint and the corresponding depth value in said second Z-buffer identifies a pixel visible to said defined light source, said corresponding second depth value (Zs) being obtained by using said interpolated values (Xs) and (Ys).

17. The computer graphics display system of claim 16, wherein said raster processing engine further includes:
- means for generating a representative color value (R,G,B) for each pixel forming said image using only said defined ambient lighting value; and
- means for adding to a corresponding (X,Y) pixel location of said frame buffer each of said generated representative color values (R,G,B) for said pixels at the corresponding (X,Y) pixel location of said frame buffer.

18. The computer graphics display system of claim 16, wherein said raster processing engine generating means (i) includes:
- means for scan converting said at least one geometric primitive into a series of pixel spans, each pixel span having end values; and
- means for interpolating said first depth value (Z) for each pixel in said pixel span from the end values of said pixel span.

19. The computer graphics display system of claim 16, wherein said raster processing engine generating means (ii) includes:
- means for scan converting said at least one geometric primitive into a series of pixel spans, each pixel span having end values; and
- means for interpolating said second depth value (Zs) for each pixel in said pixel span from the end values of said pixel span.

20. The computer graphics display system of claim 16, wherein said raster processing engine generating means (iii) includes:
- means for scan converting said at least one geometric primitive into a series of pixel spans, each pixel span having end values; and
- means for interpolating said representative color value (Rs,Gs,Bs) for each pixel in said pixel span from the end values of said pixel span.

* * * * *

UNITED STATES PATENT AND TRADEMARK OFFICE
CERTIFICATE OF CORRECTION

PATENT NO. : 5,377,313
DATED : Dec. 27, 1994
INVENTOR(S) : Scheibl

It is certified that error appears in the above-indentified patent and that said Letters Patent is hereby corrected as shown below:

Column 1, line 37, after "added" insert --to--.
Column 2, line 33, between ")" and "The" insert --.--.
Column 4, line 2, between "." and "shadow" insert --The--.

Column 14, line 67, (both occurrences) delete "spank" and substitute therefor --span--.

Signed and Sealed this

Seventh Day of March, 1995

Attest:

BRUCE LEHMAN

*Attesting Officer*  *Commissioner of Patents and Trademarks*